(12) United States Patent
Kumaran et al.

(10) Patent No.: US 8,340,999 B2
(45) Date of Patent: Dec. 25, 2012

(54) AUTOMATIC GENERATION OF EXECUTABLE COMPONENTS FROM BUSINESS PROCESS MODELS

(75) Inventors: Santhosh Babu Kumaran, Peekskill, NY (US); Rong Liu, Ossining, NY (US); Frederick Yung-Fung Wu, Cos Cob, CT (US)

(73) Assignee: International Business Machines Corporation, Armonk, NY (US)

( * ) Notice: Subject to any disclaimer, the term of this patent is extended or adjusted under 35 U.S.C. 154(b) by 992 days.

(21) Appl. No.: 11/945,297

(22) Filed: Nov. 27, 2007

(65) Prior Publication Data

US 2009/0138294 A1    May 28, 2009

(51) Int. Cl.
*G06Q 10/00* (2012.01)
(52) U.S. Cl. ............. 705/7.12; 705/7.11; 705/7.13; 705/7.14; 705/7.17; 705/7.23; 709/223; 709/224; 709/225; 709/226; 718/1; 718/100; 718/101; 718/102; 718/103; 718/104; 718/105
(58) Field of Classification Search .......... 705/7.12
See application file for complete search history.

(56) References Cited

U.S. PATENT DOCUMENTS

| | | | |
|---|---|---|---|
| 7,055,109 B2 | 5/2006 | Boden et al. | |
| 7,222,302 B2 | 5/2007 | Hauser et al. | |
| 2003/0023413 A1* | 1/2003 | Srinivasa | 703/2 |
| 2005/0091093 A1* | 4/2005 | Bhaskaran et al. | 705/7 |
| 2005/0169196 A1* | 8/2005 | Carpenter et al. | 370/255 |

FOREIGN PATENT DOCUMENTS

| WO | 2004114061 A2 | 12/2004 |
|---|---|---|
| WO | WO 2004114061 A2 * | 12/2004 |

OTHER PUBLICATIONS

Whitehead, Jr., et al. "Uniform comparison of data models using containment modeling," In Proceedings of the thirteenth ACM conference on Hypertext and hypermedia, Maryland, USA, 2002, pp. 182-191. Retreived from IDS.*

Bhattacharya, et al., "A model-driven approach to industrializing discovery processes in pharmaceutical research", IBM Systems Journal, 44(1):145-162, 2005.

Huschens, et al., "IBM Insurance Application Architecture (IAA)", V7.1, pp. 24, 2004. http://www-03.ibm.com/industries/financialservices/doc/content/solution/278918103.htm.

IBM Websphere Business Modeler (WBM), V6.0, 8 pages, 2005.

Wang et al., "A Framework for Document-Driven Workflow Systems", In Proceedings of Business Process Management, 2005, pp. 285-301.

Whitehead, Jr., et al. "Uniform comparison of data models using containment modeling," In Proceedings of the thirteenth ACM conference on Hypertext and hypermedia, Maryland, USA, 2002, pp. 182-191.

* cited by examiner

*Primary Examiner* — James A Reagan
(74) *Attorney, Agent, or Firm* — Yee & Associates, P.C.; William Stock

(57) ABSTRACT

Exemplary embodiments provide a computer implemented method, system and computer usable program code for automatically generating executable components from a process model. An input is received, wherein the input comprises a model that describes activities that needs to be performed as part of a business operation, a sequencing of the activities, and input and output data of the activities, forming a process model. A model of a set of connected business artifacts based on the process model, forming a business operation model, is generated. The business operation model is saved. The business operation model is displayed to a user. Executable components definitions based on the business operation model are generated.

20 Claims, 13 Drawing Sheets

FIG. 6

INPUT
  $E$  :the information entity set of process scope $s$, $E = \{e_1, e_2, ..., e_n\}$
  $A$  :the activity set in process scopes, $A = \{a_1, a_2, ..., a_n\}$
  $C$  :control nodes (AND - SPLIT, AND -JOIN, OR - SPLIT, OR - JOIN, START, END IN $s$
  $I_i(O_j)$ :the set of acticities using $ei$ as input (output)
  $r_j$  :connector associated with $e$ from node $n_s$ to $n_t$, $r_j = (n_s, n_t, e)$, $R = \{r_1, r_2, ...\}$
OUTPUT
  $T$  :the artifact set in scope $s$
  $D_i$  :the set of dominated entities of $e_i$
  $S_i$  :the set of staes for artifact $e_i$
BEGIN
for every $e_i \in E$               /* compute entity domination graph */
 for every $e_j \in E$ and $j \neq i$
  if $e_i \mapsto e_j$ then save $e_j$ to $D_i$
 end for
end for
for every $e_i \in E$ and $D_i \neq \emptyset$          /* find dominant information entities */
 if $e_i \in E$ and $D$ for any $j \neq i$ the save $e_i$ to $T$
end for
if $T \neq \emptyset$ then
 for every $e_i \in T$
  remove activity $a$ from $I_k$ for any $a \in I_k$ and any $e_k$ $D_i$  /* remove domiated items */
  remove activity $a$ from $O_k$ for any $a \in O_k$ and any $e_k$ $D_i$
  remove connector $r = (n_x, n_y, e_k)$ from $R$ for any $e_k \in D_i$
  for any pair of $r = (n_x, n_y, e_i)$ and $r' = (n_x, n_z, e_i)$ where $n_y \in C$  /* remove control nodes */
   remove $r$ and $r'$ from $R$, create $r'' = (n_x, n_z, e_i)$, add $r''$ to $R$
  end for
  for any connector $r = (n_x, n_y, e_i)$ where $n_x, n_y \in C$
   create a state $s_{ij}$ and save $s_{ij}$ to $S_i$    /* create states and update connectors */
   create connectors $r' = (n_x, s_{ij}, e_i)$ and $r'' = (s_{ij}, n_y, e_i)$
   remove $r$ and add $r'$ and $r''$ to $R$
  end for
 end for
END

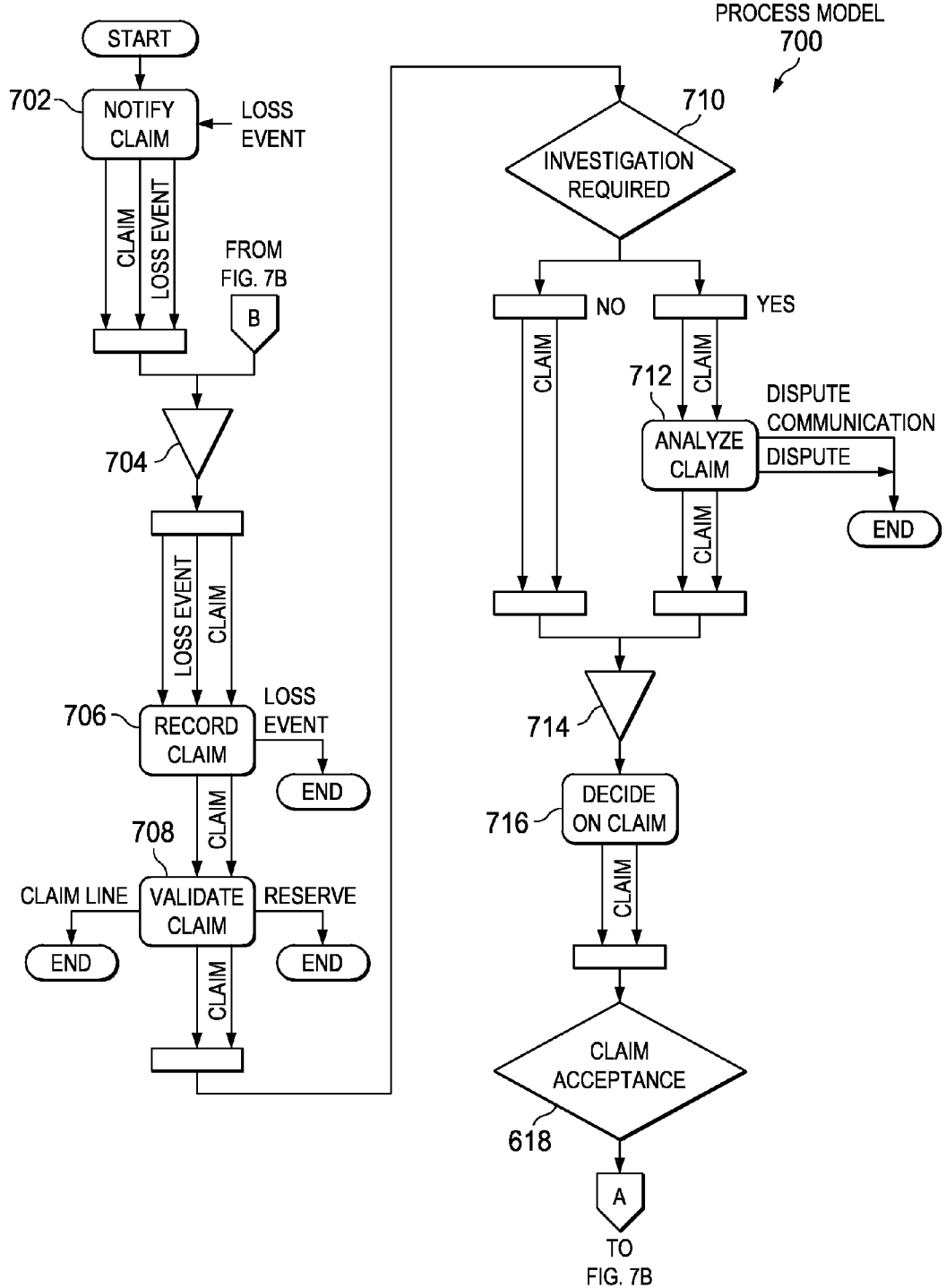

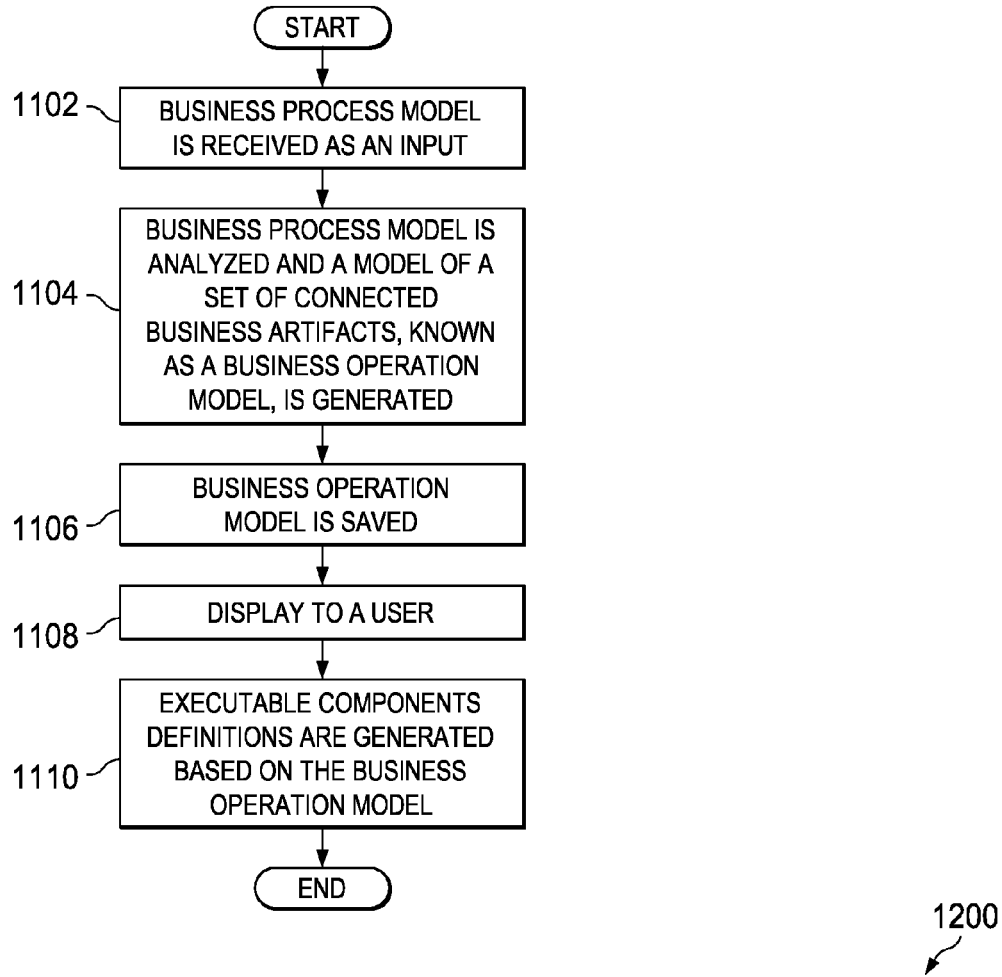
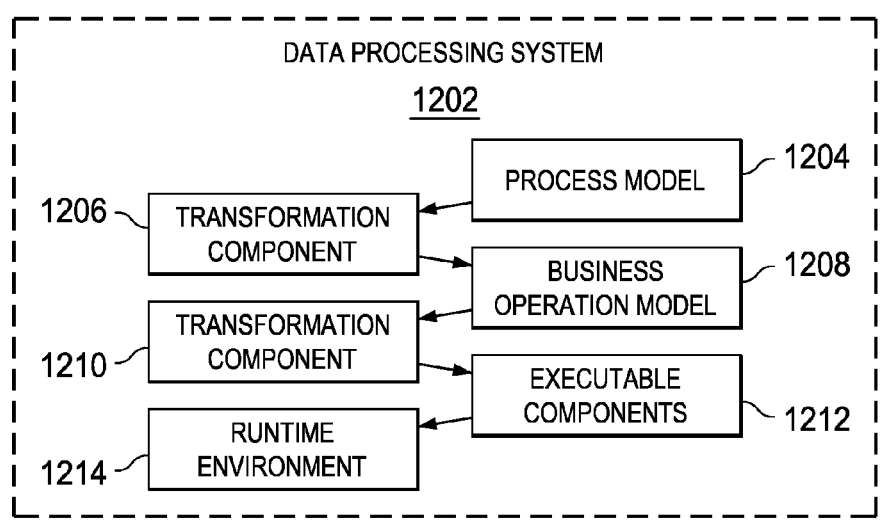

AUTOMATIC GENERATION OF EXECUTABLE COMPONENTS FROM BUSINESS PROCESS MODELS

BACKGROUND OF THE INVENTION

1. Field of the Invention

The present invention relates generally to a data processing system. More specifically, the present invention relates to a method, apparatus and computer program product for automatically generating executable components from a business process model.

2. Description of the Related Art

The role of information technologies (IT) in the enterprise is to support the business operations of the enterprise. Business subject matter experts (SMEs) document business operations using business process models. Business process models prescribe the activities that need to be performed as part of a business operation, the sequencing of these activities, and the input and output data of these activities. While business process models are good for documenting business operations, creating computer programs that support these operations has always been a challenge.

Existing approaches to IT-enabling a business process take one of the following two paths: (1) business process models are used merely as requirements based on which information technologies solutions are manually designed and implemented either by custom coding from scratch or by customizing and integrating legacy applications and packaged software; or (2) business process models are automatically converted into workflow definitions which are deployed on workflow engines and augmented with custom code. The second approach is not used widely today due to a number of severe drawbacks as enumerated below.

First, as business processes become complex and large, workflow approach becomes increasingly difficult, if not impossible, to implement, as the overall performance of the system degrades substantially and the maintenance of the resulting monolithic solution becomes extremely hard. Next, commonly required features such as backward navigation, event-driven behavior, and conversational client interaction are very difficult to support in the workflow approach. The cost of supporting these features adds more complexity, which further complicates the first issue.

As another example of a severe drawback, solutions often need sophisticated, user-friendly human interfaces, which are not readily supported by the workflow approach, which needs expensive manual tweaking of the code. Also, due to the issues enumerated above, business process models, as created by business analysts, cannot be transformed directly into workflow models. Instead, significant effort is needed to tweak the business process models into a form that is suitable for transformation into workflow models.

Moreover, no accountability exists for an end-to-end process and a lack of focus on core processes that drive customer value. Rather, the focus is on "micro" processes isolated within the borders of business function lines, which serves to distract from focusing on the end-to-end process.

Due to these drawbacks, the second approach is not used widely in real customer engagements leading to the first approach as the only alternative. However, the first approach leads to a gap between the business process models and information technologies solutions resulting in poor quality of the information technologies solutions with respect to the information technologies solutions' ability to support business processes, poor responsiveness of the information technologies solutions to business process changes, and inefficiency in the overall development processes.

In response to this situation, another process-modeling paradigm based on the concept of business artifacts has been proposed. According to this paradigm, a business artifact is an identifiable, self-describing unit-of-information through which business stockholders add value to the business. This new paradigm has been successfully tested through customer engagements. However, several problems remain with this paradigm. First, the concept of business artifacts is still informal and the definition of a business artifact is still at a conceptual level. Second, in this paradigm, the key is to discover the right business artifacts. The current practice identifies business artifacts through intense consulting sessions. Those sessions are time consuming and demand consulting skills that typically vary by industry.

Therefore, while improvements have been made in the area of transformable business process models, problems remain.

SUMMARY OF THE INVENTION

Exemplary embodiments provide a computer implemented method, system and computer usable program code for automatically generating executable components from a process model. An input is received, wherein the input comprises a model that describes activities that need to be performed as part of a business operation, a sequencing of the activities, and input and output data of the activities, forming a process model. A model of a set of connected business artifacts based on the process model, forming a business operation model, is generated. The business operation model is saved. The business operation model is displayed to a user. Executable components definitions based on the business operation model are generated.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is an example of an algorithm for transforming a business process model into a business operational model in accordance with an exemplary embodiment;

FIGS. 7A-7C are a block diagram of business process model for the insurance industry;

FIG. 11 is a flowchart illustrating the operation of transforming a process model into an executable business operation model in accordance with an exemplary embodiment; and FIG. 12 is a block diagram of a system in which aspects of exemplary embodiments may be implemented.

DETAILED DESCRIPTION OF THE PREFERRED EMBODIMENT

Figure 1:
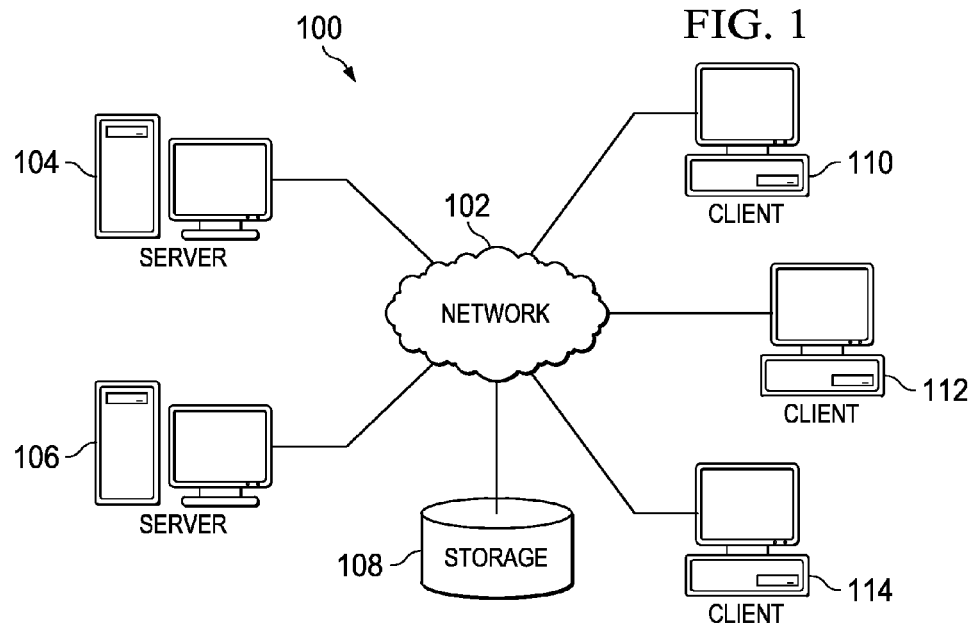
FIG. 1 depicts a pictorial representation of a network of data processing systems in which illustrative embodiments may be implemented.
Figure 2:
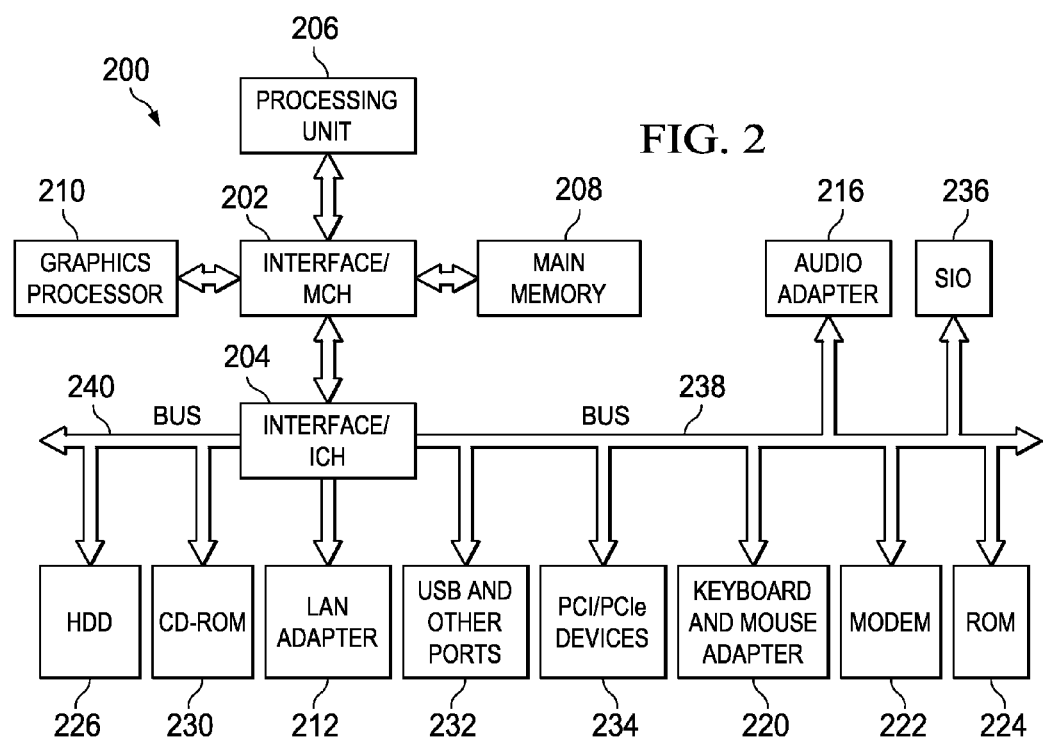
FIG. 2 is a block diagram of a data processing system is shown in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including interface and memory controller hub (interface/MCH) 202 and interface and input/output (I/O) controller hub (interface/ICH) 204. Processing unit 206, main memory 208, and graphics processor 210 are coupled to interface and memory controller hub 202. Processing unit 206 may contain one or more processors and even may be implemented using one or more heterogeneous processor systems. Graphics processor 210 may be coupled to the interface/MCH through an accelerated graphics port (AGP), for example.

In the depicted example, local area network (LAN) adapter 212 is coupled to interface and I/O controller hub 204 and audio adapter 216, keyboard and mouse adapter 220, modem 222, read only memory (ROM) 224, universal serial bus (USB) and other ports 232, and PCI/PCIe devices 234 are coupled to interface and I/O controller hub 204 through bus 238, and hard disk drive (HDD) 226 and CD-ROM 230 are coupled to interface and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to interface and I/O controller hub 204.

An operating system runs on processing unit 206 and coordinates and provides control of various components within data processing system 200 in FIG. 2. The operating system may be a commercially available operating system such as Microsoft® Windows Vista™ (Microsoft and Windows Vista are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in interface and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Exemplary embodiments provide for automatically generating executable components from a business process model. Exemplary embodiments transform a business process model into a business operation model through the use of business artifacts. Exemplary embodiments utilize business artifacts to unify business activities and information entities in a process space. A business activity is a logical description of a piece of work that consists of human and/or automated operations and is often realized in conjunction with information processing towards achieving the goal of a process.

Traditionally, a process space is viewed as points in a space composed of noun, verb, and attributes. In this traditional, three-dimension process space, a verb represents an action, a noun can be a data entity, and attributes comprise a set of expressions that can be evaluated. These dimensions are independent of each other. By this traditional definition of process space, a process may consist of a large number of points as the number of data entities, actions, and attributes increases. However, exemplary embodiments define a process space as a forest of trees rooted on dominant information entities, also referred to as dominant entities. Exemplary embodiments look at the business process behavior from the perspective of the dominant information entities as opposed to the perspective of the activities. Each dominant information entity has an entity domination graph and a behavior model shown as a state machine.

An entity domination graph is an acyclic graph comprising of nodes and unidirectional edges where each node denotes an information entity and an edge denotes the domination relationship from the originating node to the ending node. An acyclic graph is a graph that contains no cycles. A unidirectional edge is an edge that flows in only one direction. A behavior model describes the evolution of a business artifact through a set of states meaningful to business users where the transitions between states are achieved by business activities. A state machine is a model of behavior composed of a finite number of states, transitions between those states, and actions performed during the transitions.

A business process links business activities by transforming an input into a more valuable output. In terms of the information domain of the business, both input and output are information entities. An information domain is the set of information entities used in processes. An information entity, which is sometimes simply referred to as an entity, is a grouping of data elements. Each information entity is used in one or more business activities as an input and/or as an output.

Figure 3:
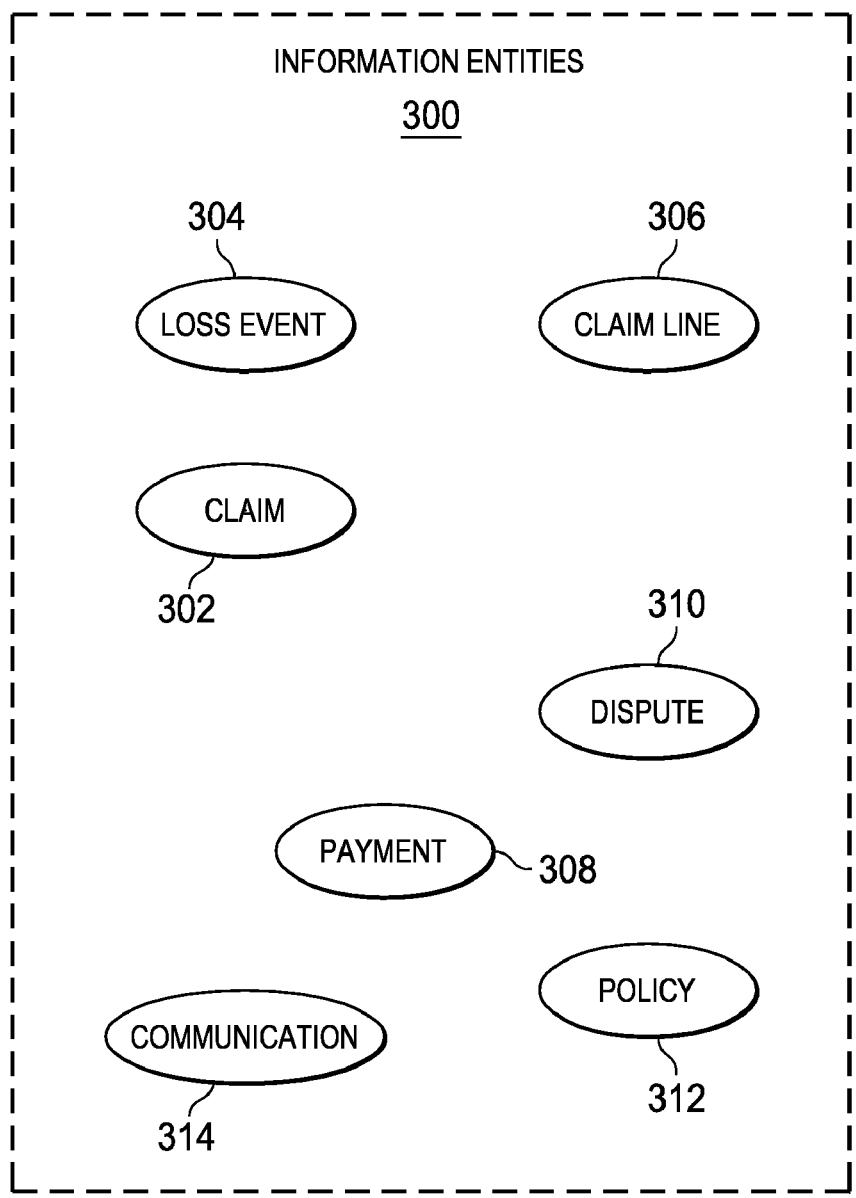
FIG. 3 is a block diagram of information entities in accordance with an exemplary embodiment.

FIG. 3 is a block diagram of information entities in accordance with an exemplary embodiment. Information entities 300 are examples of information entities in an insurance business. Information entities 300 comprise information entities claim 302, loss event 304, claim line 306, payment 308, dispute 310, policy 312, and communication 314. Claim line 306 is an example of a claim item corresponding to a single coverage from a single insurance policy and for a single claimant or beneficiary.

Figure 4:
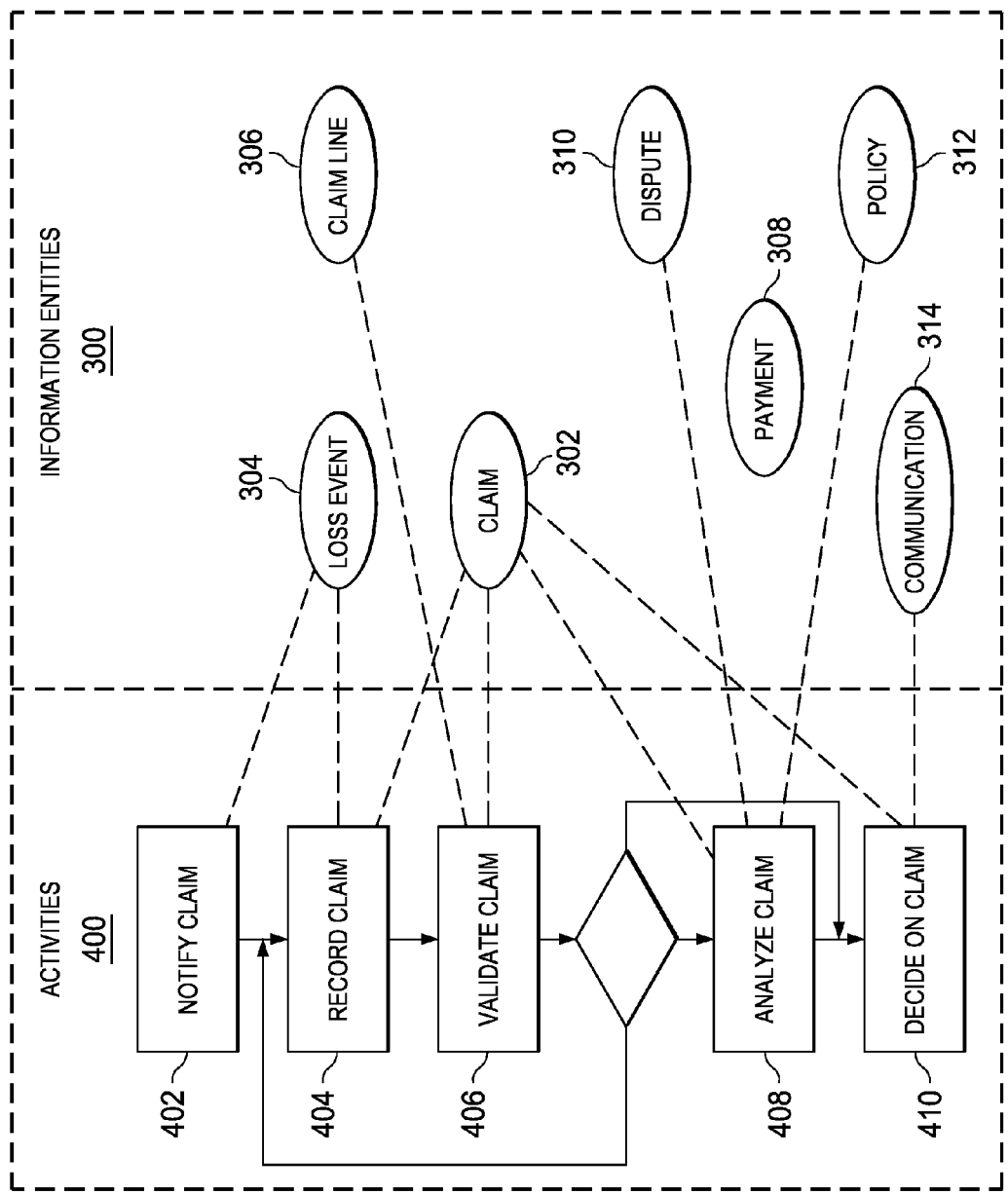
FIG. 4 is a block diagram of business activities and related information entities in accordance with an exemplary embodiment.

FIG. 4 is a block diagram of business activities and related information entities in accordance with an exemplary embodiment. FIG. 4 shows activities 400 and the related information entities 300 that are inputs or outputs of these activities. Activities 400 comprise the business activities of notify claim 402, record claim 404 validate claim 406, analyze claim 408 and decide on claim 410. Each business activity uses at least one information entity. The business activities that comprise activities 400 form a business process.

The dotted lines in FIG. 4 indicate information entities engaged in the business activities. Therefore, business activities of notify claim 402 involves information entity loss event 304. Business activities record claim 404 involves information entities claim 302 and loss event 304. Business activities validate claim 406 involves information entities claim 302 and claim line 306. Business activities analyze claim 408 involves information entities claim 302, dispute 310, and policy 312. Business activities decide on claim 410 involves information entities claim 302, payment 308 and communication 314.

A process scope is a group of business processes, together providing a well-defined end-to-end function to map input I to output O, i.e. s:I→O, s={$p_1, p_2, \ldots, p_n$}, I={$e_{I1}, e_{I2}, \ldots, e_{Ix}$}, O={$e_{O1}, e_{O2}, \ldots, e_{Oy}$}, where each p is a process and each e is an information entity.

For example, an end-to-end claim management process involves recording claim, validating claim, deciding on claim, and so forth, until closing the claim. The input to this process scope is a loss event and outputs are a set of entities including archived claim, outgoing payment, and communication documents with the claimant.

Within a process scope, information entities are structured in such a way that the information entities provide sufficient information to the component business activities to achieve the desired end-to-end function. For example, in the business process shown in FIG. 4, most business activities require information entity claim 302. Each of the business activities, activities 400, happens because the individual business activity causes changes to information entity claim 302 that enable the completion of the goal of the process scope.

Moreover, in order to perform such business activities, other information entities are read, modified, or created. Therefore, within a process scope, an information entity can dominate other information entities in the sense that the dominant information entity is the driving force to enabling the completion of the targeted goal.

Thus, it can be said that an information entity $e_1$ dominates information entity $e_2$ in a process scope s, denoted as $e_1 \alpha e_2$, if:

(1) $\forall a \in s$, if $e_2 \in \bullet a$, then $e_1 \in \bullet a$, where a is an activity, $\bullet a$ (a$\bullet$) is the input (output) entity set of a (2) $\forall a \in s$, if $e_2 \in a\bullet$, then $e_1 \in a\bullet$ (3) $\exists a \in s$, s.t. $e_1 \in \bullet a \cup a\bullet$, but $e_2 \notin \bullet a \cup a\bullet$ In other words, $e_1$ dominates $e_2$, if (1) for every activity that $e_2$ is used as an input, $e_1$ is also used as an input, (2) for every activity that $e_2$ is used as an output, $e_1$ is used as an output, and (3) $e_1$ is used in at least one activity where $e_2$ is not used.

If $e_2$ is only used as an input in the process scope, this domination is called referential domination. When $e_2$ is used as an output in at least one business activity, this domination is called inclusive domination. Furthermore, a dominant information entity, or dominant entity, is not dominated by any other information entity in a process scope. Accordingly, a dominated information entity, or dominated entity, is dominated by at least one information entity in a process scope. The domination relationship is transitive, i.e. if $e_1 \alpha e_2$, $e_2 \alpha e_3$ then $e_1 \alpha e_2$.

Figure 5:
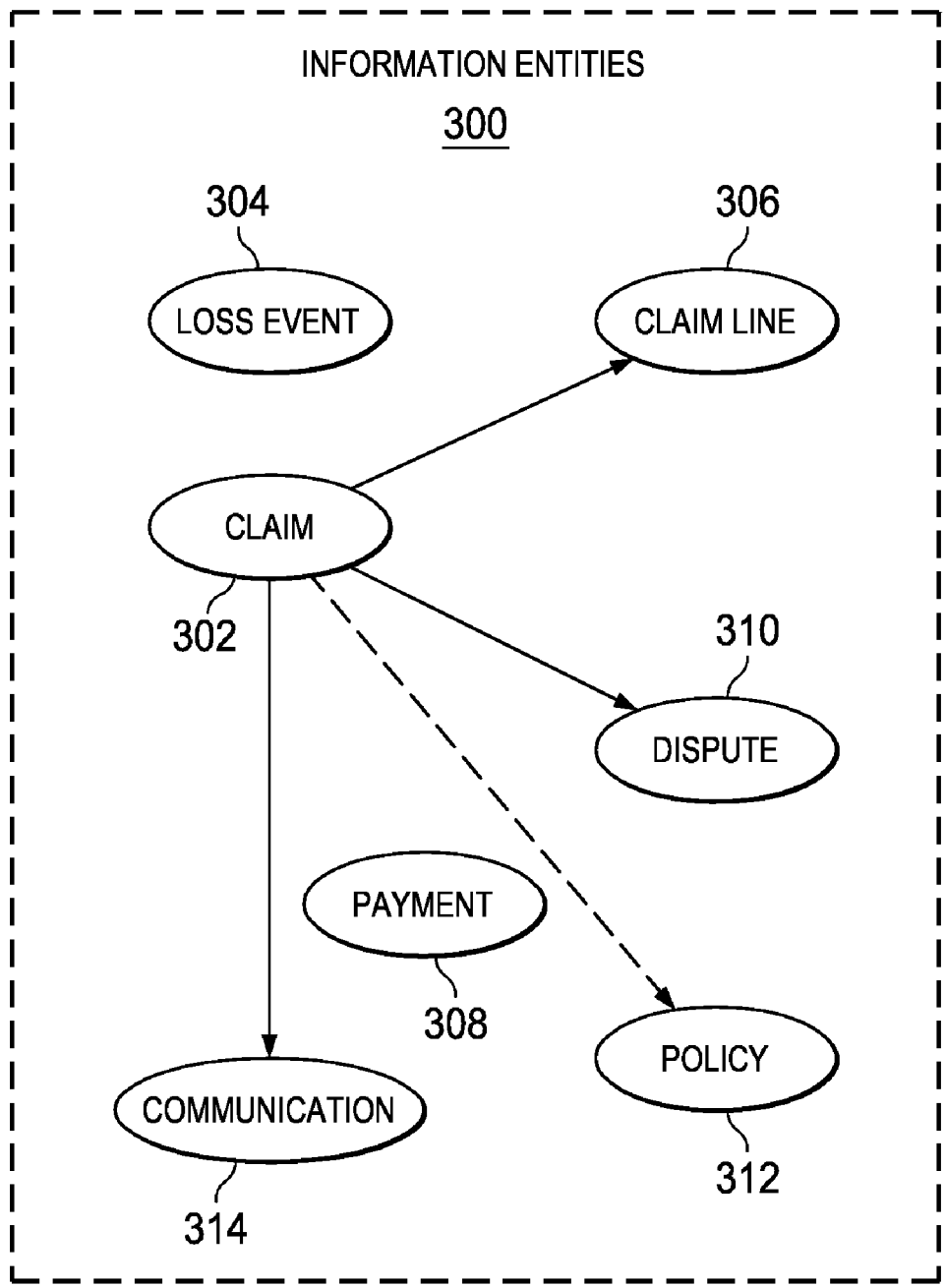
FIG. 5 depicts examples of domination relationships in an business process scope in accordance with an exemplary embodiment.

FIG. 5 depicts examples of domination relationships in a business process scope in accordance with an exemplary embodiment. The set of information entities 300 in FIG. 3 are presented here to illustrate domination relationships as they relate to the business scope illustrated by the business activities 400 in FIG. 4. A dotted line between the entities illustrates referential domination. A solid line between the entities represents inclusive domination. Information entity claim 302 referentially dominates information entity policy 312 because information entity policy 312 is only an input for the processing of information entity claim 302. However, information entity policy 312 is not changed within the business process depicted in FIG. 4.

Information entity claim 302 inclusively dominates information entities claim line 306, dispute 310, and communication 314. There are still some information entities, for example, loss event 304 and payment 308, that are not involved in any domination relationship. FIG. 5 is referred to as an entity domination graph that describes the domination relationships between information entities within a process scope.

A business artifact, sometimes simply referred to as an artifact, is a dominant information entity with an associated data model and an associated behavior model in the context of a process scope. The data model describes the data dependencies between a dominant information entity and the dominated information entities as the dominant entity containing the dominated entities. The behavior of the business artifact is modeled as a state machine where artifact state transitions are caused by activities acting upon the artifact.

Each business artifact has a behavior model that is represented as a state machine. Therefore, business artifacts are an abstraction that componentize the information domain of a business such that the behavior models associated with these components, described using state machines, fully capture the business process functionality. Moreover, business artifacts provide the information context for business activities and processes. Typically, within a process scope, the provided business processes require customer inputs. The customer inputs may initiate an instance of a business artifact. The outputs of the business process may be represented as the final state of the business artifact and perhaps other business artifacts created during the process. Therefore, the business process is also the process of business artifacts walking through their lifecycle, from their initial states to their final states.

A business operation model is a set of connected business artifacts. Two business artifacts are connected if one business artifact sends/receives a message to/from another business artifact. Exemplary embodiments use the concept of domination to transform a process model into an operational model. In an exemplary embodiment, an algorithm is used to transform a process model into the operational model.

FIG. 6 is an example of an algorithm for transforming a business process model into a business operational model in accordance with an exemplary embodiment. The exemplary algorithm depicted in FIG. 6 comprises four main steps: (1) discovering business artifacts and constructing a data graph D for information entities; (2) determining input (I) and output (O) business artifacts of business activities; (3) creating an output state for each output business artifact of an activity; and (4) connecting an activity to the output artifact states and connecting each output state to the next activity touched by the artifact.

Exemplary embodiments accomplish step (1) through use of the definitions of domination and business artifacts. Exemplary embodiments accomplish step (2) by making the following determinations: a business artifact is an input business artifact of an activity if either the business artifact or any of the dominated information entities of the business artifact are used as an input of the activity in question. Similarly, a business artifact is an output business artifact of an activity if either the business artifact is an output of the activity in question or any of the dominated information entities of the business artifact is an output of the activity. Steps (3) and (4) construct state machines for artifacts preserving the sequence between activities as in the activity-centric business processes.

FIGS. 7 through 10 illustrate an example of transforming a business process model into a business operation model of executable units using the concept of business artifacts in accordance with an exemplary embodiment.

Figure 7B:
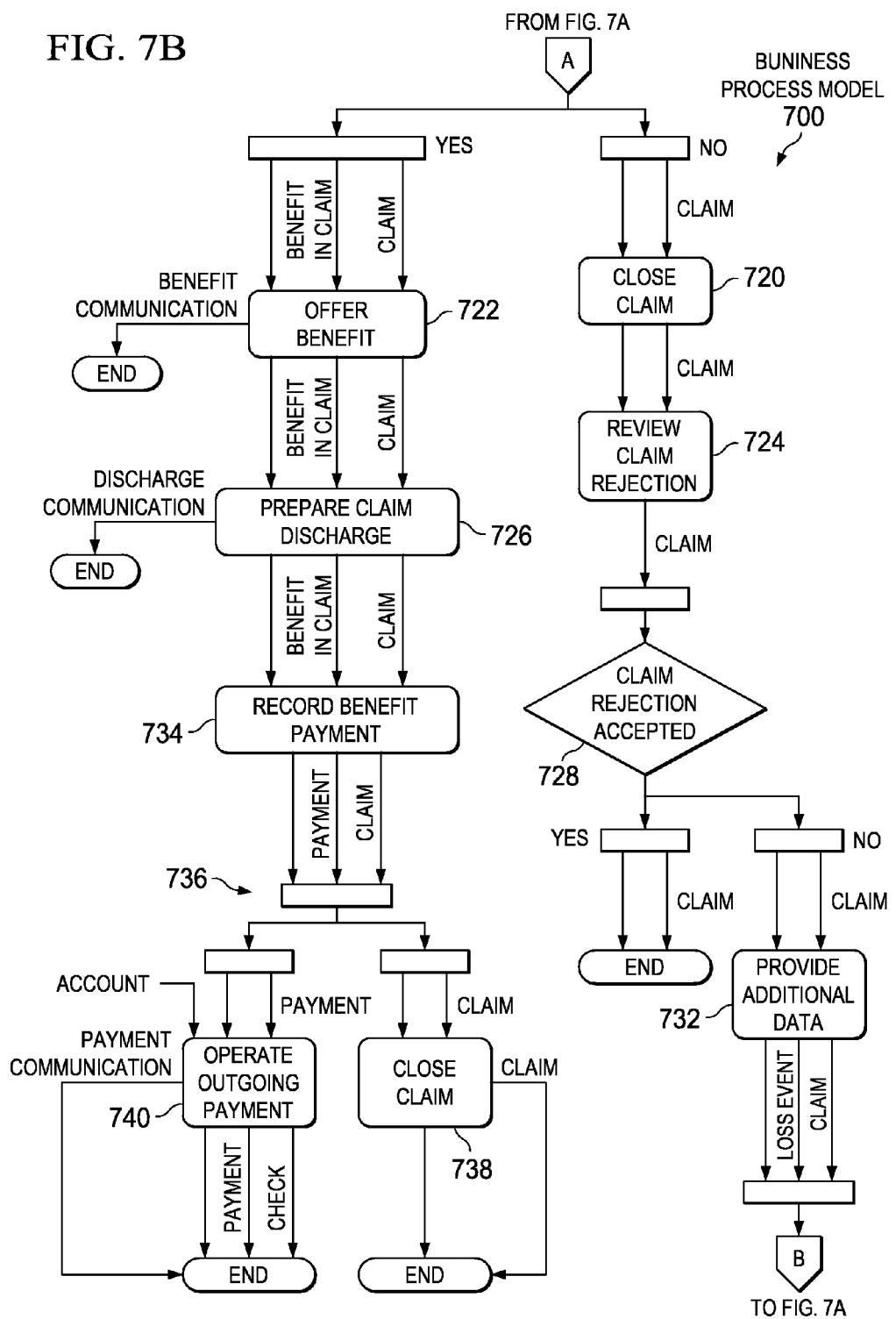
Figure 7C:
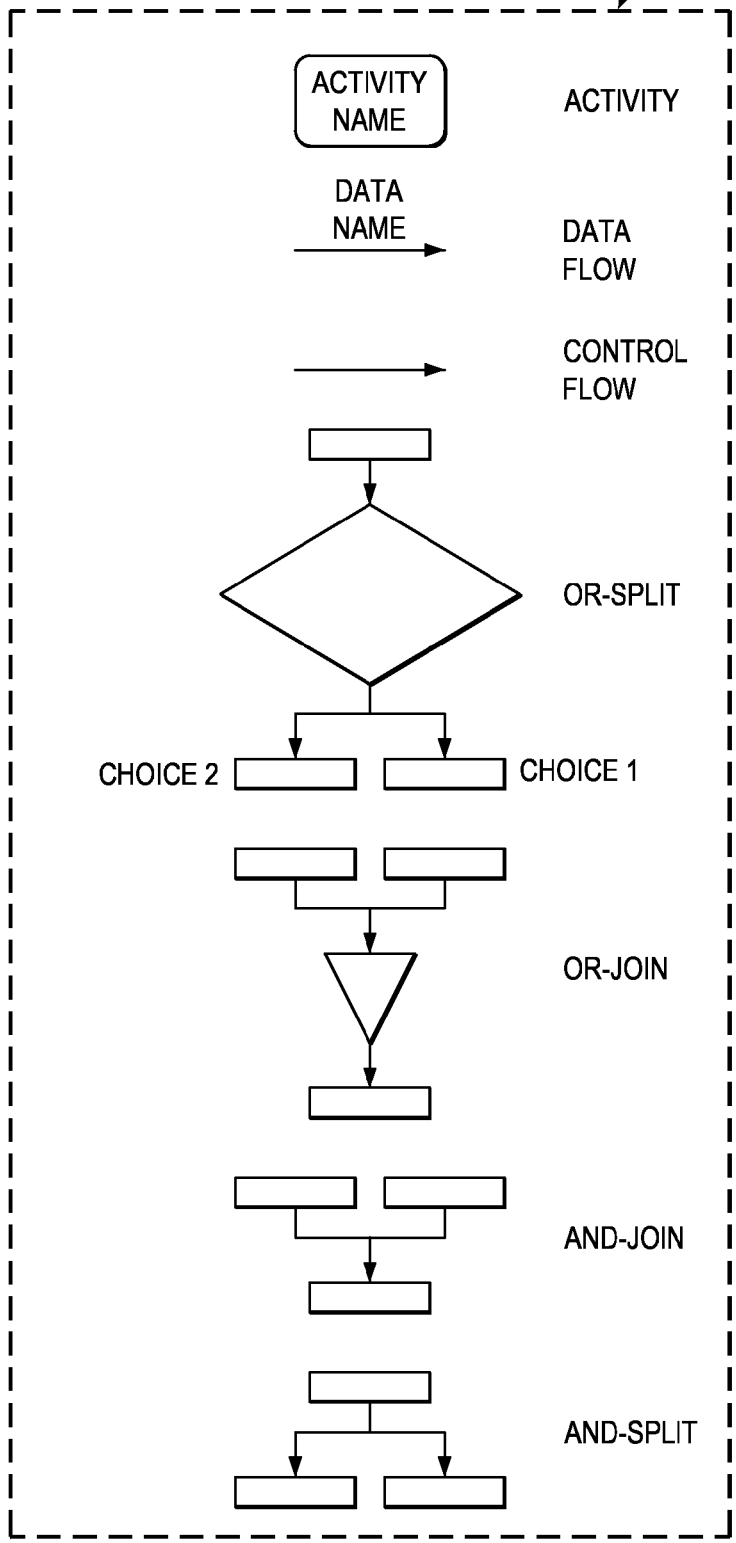
Figure 8:
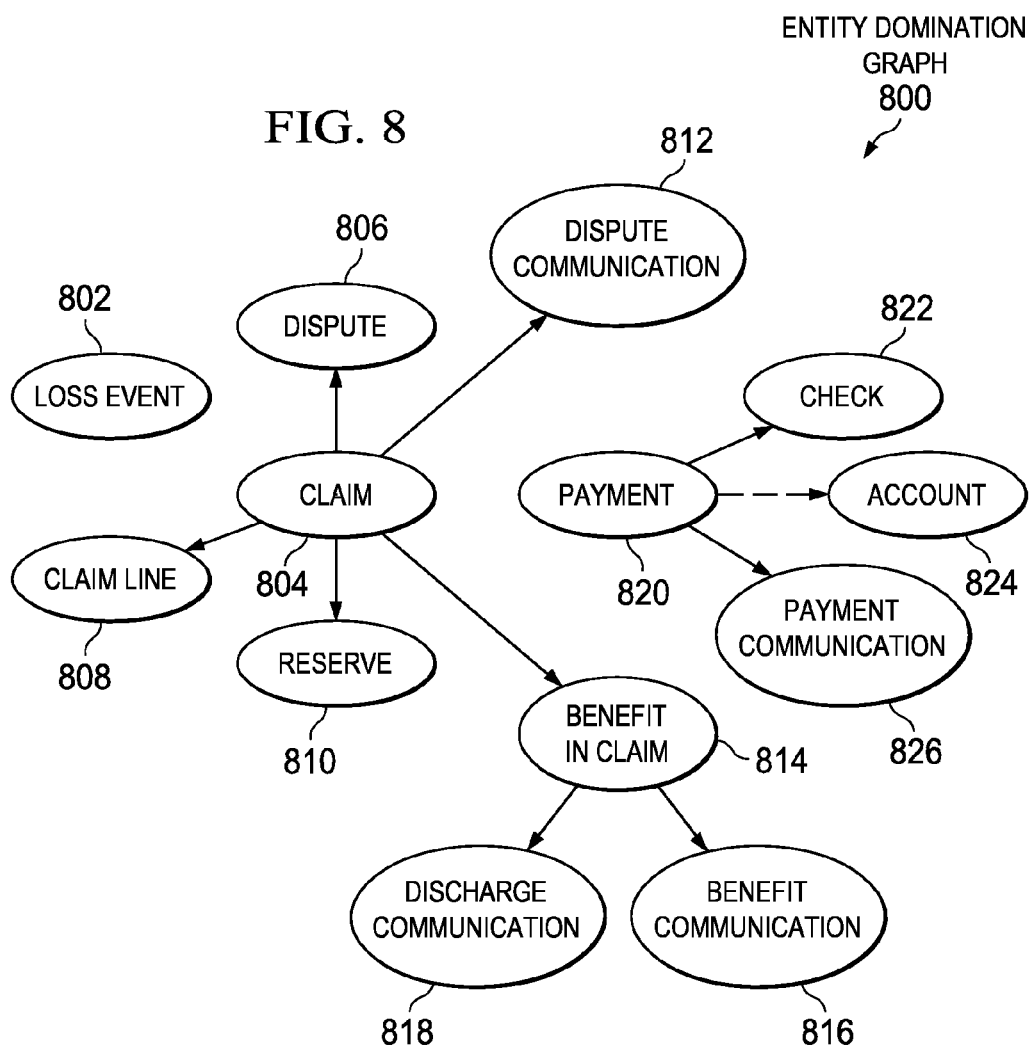
FIG. 8 is an entity domination graph for the business process model of FIGS. 7A-7C in accordance with an exemplary embodiment.
Figure 9A:
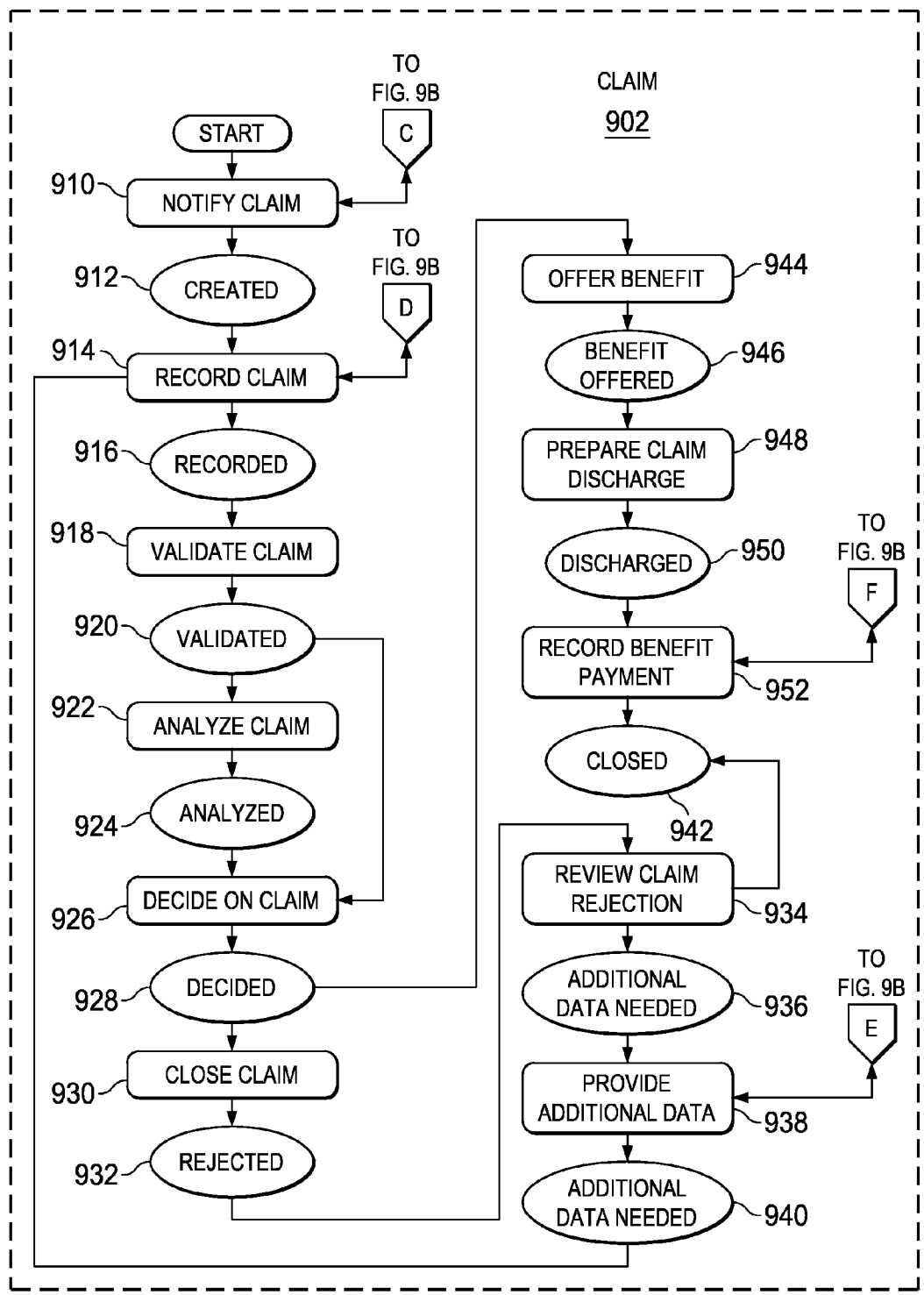
FIGS. 9A & 9B are a block diagram of the behavior model for the business artifacts of business process model 700 in FIGS. 7A-7C in accordance with an exemplary embodiment.
Figure 9B:
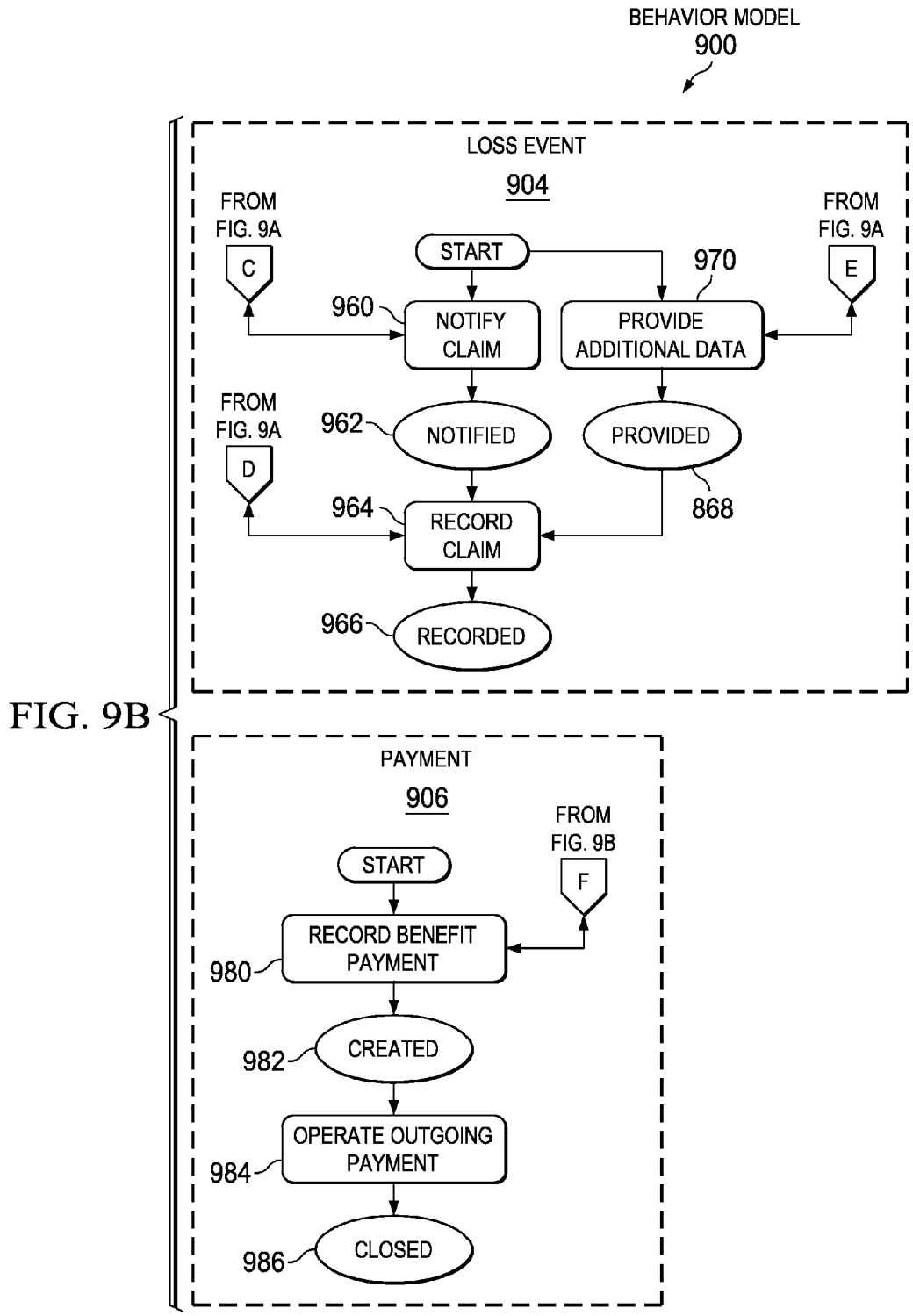
Figure 10:
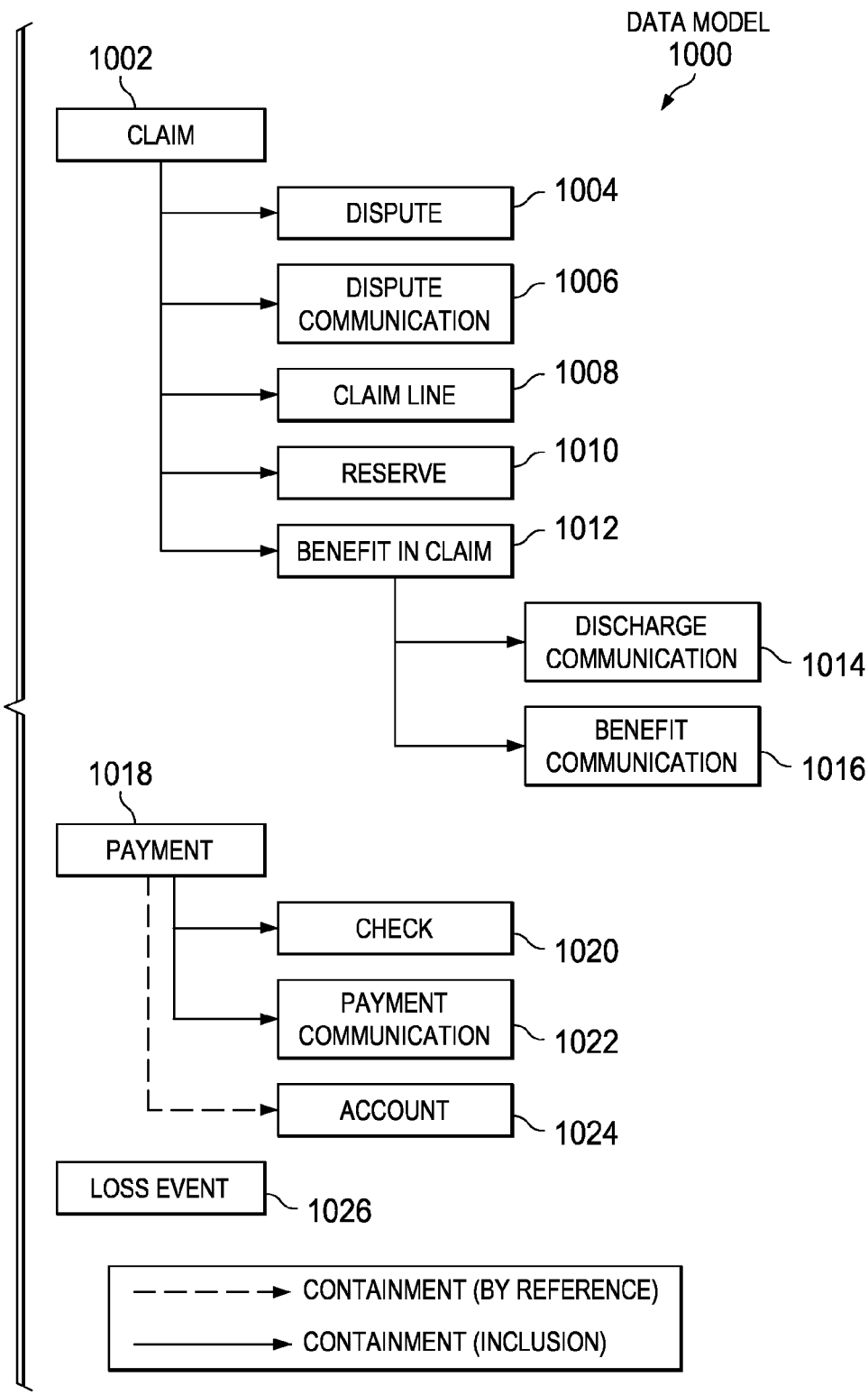
FIG. 10 is a block diagram of the data model derived from the entity domination graph 800 in FIG. 8 in accordance with an exemplary embodiment.

FIGS. 7A-7C are a block diagram of business process model for the insurance industry. In general, business process models, such as business process model 700, are used for analytical purposes, and thus are called analysis models. In practice, system analysts have to manually customize these analysis models on a case-by-case basis in order to implement them. Exemplary embodiments automatically transform business process model 700 into a business operation model, as shown in FIGS. 9A & 9B and FIG. 10, through the use of the transformation algorithm described in FIG. 6. FIG. 8 is an intermediate work product created by the algorithm. FIGS. 9A & 9B and FIG. 10 together constitute the business operation model.

Business process model 700 is comprised of both data flows and control flows. In FIGS. 7A-7C, a line with the name of the data being conveyed illustrates a data flow. Conversely, a line with no accompanying text illustrates a control flow. Examples are presented in legend 760. Control flows enforce the sequence of activities or sub-processes. Most control flows in business process model 700 are redundant since data flows imply similar constraints between activities.

Business process model 700 begins when data flows of a loss event triggers the activity notify claim 702. Data flow for data loss event and claim and a control flow leave from activity notify claim 702 and flow through or-join 704 and into activity record claim 706. The data flow for data loss event ends after activity record claim 706, while the data flow claim and the control flow continue on to activity validate claim 708. Data flows for reserve and claim line leave activity validate claim 708 and end. The data flow for claim and the control flow leave activity validate claim 708 and travel to or-split into investigation required 710. If the data flow for claim follows the "no" path, then the data flow for claim and the control flow continues on through or-join 714 into activity decide on claim 716.

If the data flow for claim follows the "yes" path, then the data flow for claim and the control flow continues on to activity analyze claim 712. Data flows for dispute communication and dispute leave activity analyze claim 712 and end. The data flow for claim and the control flow exit activity analyze claim 712 and proceed through or-join 714 into activity decide on claim 716. The data flow for claim and the control flow proceed from activity decide on claim 716 through or-split into claim acceptance 718.

If the process follows the "no" path from or-split into claim acceptance 718, the data flow for claim and the control flow pass to activity close claim 720. The data flow for claim and the control flow continue to activity review claim rejection 724. The data flow for claim then passes to or-split into claim rejection accepted 728. If the process takes the "yes" path, the data flow for claim and the control flow end. If the process takes the "no" path, then the data flow for claim and the control flow proceed to activity provide additional data 732, which outputs a data flow for claim and loss event as well as a control flow that are then input into or-join 704.

If the process follows the "yes" path from or-split into claim acceptance 718, the data flows for claim and benefit, as well as the control flow are accepted as inputs into activity offer benefit 722. A data flow for benefit communication leaves activity offer benefit 722 and ends. Data flows for claim and benefit in claim and the control flow proceed to activity prepare claim discharge 726. A data flow for discharge communication leaves activity prepare claim discharge 726 and ends. Data flows for claim and benefit in claim and the control flow proceed to activity record benefit payment 734.

The activity record benefit payment 734 outputs data flows for claim and payment as well the control flow to and-split 736. The data flow for claim and a control flow proceed to activity close claim 738, which outputs a data flow for claim and a control flow that end. The data flow for payment and a control flow, as well as a data flow for account are input into activity operate outgoing payment 740, which generates output data flows for payment communication, payment, and check, as well a control flow, all of which then end.

Business process model 700 may be viewed as a process scope as business process model 700 provides an end-to-end function from creating a claim after a loss event is notified to closing claim and managing payment. Furthermore, each data item in business process model 700 is an information entity.

FIG. 8 is an entity domination graph for the business process model of FIGS. 7A-7C in accordance with an exemplary embodiment. Entity domination graph 800 is determined through the use of the algorithm presented in FIGS. 7A-7C. Exemplary embodiments employ the concept of domination to determine the relationships between the information entities present in business process model 700 in FIGS. 7A-7C. Entity domination graph 800 illustrates these relationships.

Looking at entity domination graph 800, it is apparent that there are three business artifacts present: information entities loss event 802, claim 804, and payment 820. Dominant information entities claim 804 and payment 820 have several dominated information entities. Dominant information entity payment 820 dominates information entities check 822, account 824, and payment communication 826. The information entity account is dominated referentially by dominant information entity payment 820, which is indicated by the dotted line, while information entities check 822 and payment communication 826 are dominated inclusively by dominant information entity payment 820.

Dominant information entity claim 804 inclusively dominates information entities dispute 806, claim line 808, reserve 810, dispute communication 812, and benefit in claim 814. In turn, dominated information entity benefit in claim 814 inclusively dominates information entities benefit communication 816 and discharge communication 818. Since a domination relationship is transitive, dominant information entity claim 804 also inclusively dominates information entities benefit communication 816 and discharge communication 818.

FIGS. 9A & 9B are a block diagram of the behavior model for the business artifacts of business process model 700 in FIGS. 7A-7C in accordance with an exemplary embodiment. Behavior model 900 comprises the state machines for three business artifacts of business process model 700 in FIGS. 7A-7C, business artifacts claim, loss event, and payment. Behavior model 900 is an output of the algorithm presented in FIG. 6 using business process model 700 of FIGS. 7A-7C as the initial input. State machine claim 902 represents the behavior model of business artifact claim. State machine loss event 904 represents the behavior model of business artifact loss event. State machine payment 906 represents the behavior model of business artifact payment.

The business activities presented in various steps of behavior model 900 are the business activities presented in business process model 700 in FIGS. 7A-7C. For example, the notify claim business activity shown in step 910 of state machine claim 902 and step 960 of state machine loss event 904 are the same business activity, business activity notify claim 702 in FIGS. 7A-7C.

State machine payment 906 starts with the business artifact payment encountering the business activity record benefit payment (step 980), which causes the payment to be created (step 982). Next, the business artifact payment interacts with the business activity of operate outgoing payment (step 984), which causes the payment to be closed (step 986).

State machine loss event 904 starts with the business artifact loss event encountering the business activity notify claim (step 960). This causes the policyholder to be notified (step 962). Next, the business artifact loss event interacts with the business activity of record claim (step 964), which causes the claim to be recorded (step 966). Alternatively, state machine loss event 904 starts with the business artifact loss event encountering the business activity provide additional data (step 970), which causes additional data to be provided (step 968). The additional information is then provided to business activity record claim (step 964), which causes the claim to be recorded (step 966).

State machine claim 902 starts with the business artifact claim encountering the business activity notify claim (step 910), which causes a claim to be created (step 912). Next, business artifact claim interacts with the business activity of record claim (step 914), which causes the claim to be recorded (step 916). Next, business artifact claim interacts with the business activity of validate claim (step 918), which causes the claim to be validated (step 920). Once the claim is validated, the operation either continues onto business activity decide on claim (step 926) or the business activity of analyze claim is encountered (step 922), which causes the claim to be analyzed (step 924). Next, the business activity decide on claim is encountered (step 926), which causes the claim to be decided (step 928).

Once the claim is decided, business artifact claim may proceed to the business activity of offer benefit (step 944), which causes a benefit to be offered (step 946). Next the business artifact encounters the business activity of prepare claim discharge (step 948), which causes the claim to be discharged (step 950) and the business activity of record benefit payment to be activated (step 952), which closes the claim (step 942).

Alternately, once the claim is decided, business artifact claim proceeds to the business activity of close claim (step 930), which causes the claim to be rejected (step 932). This, in turn, leads to the business activity of review claim rejection (step 934). Based on the result of the business activity of review claim rejection, the claim may either be closed (step 942) or additional data may be needed (step 936). If additional data is needed the business activity provide additional data is invoked (step 938), which causes additional data to be added (step 940). This additional data is fed into the business activity of record claim (step 914), where the process continues until such time as it closes.

As can be seen in behavior model 900, business artifact claim is connected to business artifacts loss event and payment, as business artifact claim sends and or receives message from these artifacts, as indicated by the dotted lines. That is, during the business activities of notify claim, record claims and provide additional data, business artifacts claim and loss event communicate with each other. During the business activity of record benefit payment, the business artifacts of claim and payment communicate with each other. In other exemplary embodiments, all state machines in the business operation model may communicate with each other.

FIG. 10 is a block diagram of a data model derived from the entity domination graph 800 in FIG. 8 in accordance with an exemplary embodiment. Based on data graphs, such as entity domination graph 800 in FIG. 8, data models can be created at the granularity level consistent with business activities.

Thus, data model 1000 shows business artifact claim, claim 1002, as the root node of a tree, and business artifact claim's inclusively dominated information entities as child nodes dispute 1004, dispute communication 1006, claim line 1008, reserve 1010, benefit in claim 1012, which has child nodes discharge communication 1014 and benefit communication 1016. Similarly, business artifact payment, payment 1018, is shown as the root node of another tree, with child nodes check 1020, payment communication 1022, and referential item account 1024. Business artifact loss event, loss event 1026, is shown as the root node of another tree, which has no child nodes.

FIG. 11 is a flowchart illustrating the operation of transforming a business process model into an executable business operation model in accordance with an exemplary embodiment. An executable business operation model is a computer program that runs on a data processing system. The operation of FIG. 11 may be implemented in a data processing system, such as data processing system 1202 in FIG. 12. More specifically, steps 1102 though 1108 may be performed by transformation component 1206 in FIG. 12, step 1110 may be performed by transformation component 1210 in FIG. 12. The operation begins when a business process model is received as an input (step 1102). Business process models prescribe the activities that need to be performed as part of a business operation, the sequencing of these activities, and the input and output data of these activities. The business process model is analyzed and a model of a set of connected business artifacts, known as a business operation model, is generated (step 1104). Specifically, business process model is analyzed and a domination graph is generated. Then, each business artifact in the domination graph, a data model and a behavior model is created. The behavior model is created as a state machine using the business activities touched by the business artifact. The business operation model is saved (step 1106) and displayed to a user (step 1108).

Using transformation components that are known in the art, executable components definitions are generated based the business operation model (step 1110), which may then be executed in an appropriate runtime environment, and the operation ends. The runtime environment may be on the same data processing system that generated the executable components. Alternately, the runtime environment may be on a data processing system that is remote from the data processing system that generated the executable components. In such a case, the generated executable components would need to be saved and transmitted to the remote data processing system.

FIG. 12 is a block diagram of a system in which aspects of exemplary embodiments may be implemented. The aspects of exemplary embodiments may be implemented using the approach given in the flowchart in FIG. 11. System 1200 comprises data processing system 1202, which may be implemented as data processing systems 200 in FIG. 2. Data processing system 1202 has one or more process model 1204 that the user of data processing system 1202 desires to be transformed into a business operation model, such as business operation model represented in FIGS. 9 and 10. Process model 1204 is input into transformation component 1206. Transformation component 1206 transforms the input process model 1204 into output business operation model 1208, through the use of a transformation algorithm, such as the transformation algorithm presented in FIG. 6. The output business operation model 1208 is saved and displayed to a user. Using known transformation components, transformation component 1210, business operation model 1208 is then transformed into executable component 1212. Executable component definitions are computer programs that run on some data processing system. These executable component definitions are then input into an appropriate runtime environment, such as runtime environment 1214, where they are executed.

In alternate embodiments, system 1200 may comprise two, three, four, or more data processing systems. For example, process model 1204 may reside on a first data processing system, which then sends process model 1204 to a second data processing system, which uses process model 1204 as input to transformation components 1206. Transformation component 1206 produces an output business operation model 1208, which is sent to a third data processing system. The third data processing system displays business operation model 1208 to a user, who then uses business operation model 1208 as input to transformation component 1210, which is a well-known transformation component for production executable components. Transformation component 1210 produces executable components 1212 as an output. Executable components 1212 are configured to execute in a specific type of runtime environment. The third data processing system then sends executable components 1212 to a fourth data processing system, where the appropriate runtime environment, runtime environment 1214, resides. Executable components 1212 are executed in runtime environment 1214 on the fourth data processing system.

Thus, exemplary embodiments provide solution to deficiencies in the prior art by automatically generating executable components from a business process model. Exemplary embodiments transform a business process model into a business operation model through the use of business artifacts. Exemplary embodiments utilize business artifacts to unify business activities and information entities in a process space. Exemplary embodiments look at the business process behavior from the perspective of the information entities as opposed to the perspective of the activities.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for automatically generating executable components from a process model, the computer implemented method comprising:
    receiving the process model, wherein the process model comprises activities performed as part of a business operation, a sequencing of the activities, and input and output data of the activities;
    generating a business operation model from the process model, wherein the business operation model comprises a set of connected dominant information entities;
    optionally saving the business operation model;
    optionally displaying the business operation model to a user; and
    generating executable component definitions based on the business operation model;
    wherein the step of generating the business operation model is carried out by (1) generating a domination graph for each dominant information entity comprising nodes and unidirectional edges such that there are no cycles for each information entity, wherein each node in the domination graph represents an information entity and each unidirectional edge represents a domination relationship between a dominant information entity and a dominated information entity; (2) generating a behavior model for each dominant information entity, wherein the behavior model comprises the activities of the process model having the dominant information entity as an input or an output; and (3) generating the business operation model containing behavior models of the set of connected dominant information entities which exchange messages between one another; and
    wherein a first information entity is a dominant information entity over a second dominated information entity when (1) for each activity having the second information entity as an input, the first information entity is also an input, (2) for each activity having the second information entity as an output, the first information entity is also an output, and (3) the first information entity is used in at least one activity where the second information entity is not used.

2. The computer implemented method of claim 1, wherein generating the behavior model for each dominant information entity further comprises:
    generating a state machine for each dominant information entity comprising a finite number of states, transitions between the finite number of states, and actions performed during the transitions.

3. The computer implemented method of claim 1, wherein the information entity is a grouping of data elements.

4. The computer implemented method of claim 1, wherein the dominant information entity dominates the dominated information entity through one of referential domination or inclusive domination.

5. The computer implemented method of claim 1, wherein the domination graph describes data dependencies between the dominant information entity and the dominated information entities as the dominant information entity contains the dominated information entities.

6. The computer implemented method of claim 1, further comprising:
    executing the executable components definitions.

7. A computer program product comprising:
    a computer readable storage medium having computer usable program code stored thereon for automatically generating executable components from a process model, the computer program product comprising:
    computer usable program code for receiving the process model, wherein the process model comprises activities performed as part of a business operation, a sequencing of the activities, and input and output data of the activities;
    computer usable program code for generating a business operation model from the process model, wherein the business operation model comprises a set of connected dominant information entities;
    computer usable program code for optionally saving the business operation model;
    computer usable program code for optionally displaying the business operation model to a user; and
    computer usable program code for generating executable component definitions based on the business operation model;
    wherein the computer usable program code for generating the business operation model is carried out by (1) generating a domination graph for each dominant information entity comprising nodes and unidirectional edges such that there are no cycles for each information entity, wherein each node in the domination graph represents an information entity and each unidirectional edge represents a domination relationship between a dominant information entity and a dominated information entity; (2) generating a behavior model for each dominant information entity, wherein the behavior model comprises the activities of the process model having the dominant information entity as an input or an output; and (3) generating the business operation model containing behavior models of the set of connected dominant information entities which exchange messages between one another; and
    wherein a first information entity is a dominant information entity over a second dominated information entity when (1) for each activity having the second information entity as an input, the first information entity is also an input, (2) for each activity having the second information entity as an output, the first information entity is also an output, and (3) the first information entity is used in at least one activity where the second information entity is not used.

8. The computer program product of claim 7, wherein the computer useable program code for generating the behavior model for each dominant information entity further comprises:
computer useable program code for generating a state machine for each dominant information entity comprising a finite number of states, transitions between the finite number of states, and actions performed during the transitions.

9. The computer program product of claim 7, wherein the information entity is a grouping of data elements.

10. The computer program product of claim 7, wherein the dominant information entity dominates the dominated information entity through one of referential domination or inclusive domination.

11. The computer program product of claim 7, wherein the domination graph describes data dependencies between the dominant information entity and the dominated information entities as the dominant information entity contains the dominated information entities.

12. The computer program product of claim 7, further comprising:
computer useable program code for executing the executable components definitions.

13. A data processing system for automatically generating executable components from a process model, the data processing system comprising:
a bus;
a communications unit connected to the bus;
a storage device connected to the bus, wherein the storage device stores computer usable program code; and
a processor unit connected to the bus, wherein the processor unit executes the computer usable program code to:
receive the process model, wherein the process model comprises activities performed as part of a business operation, a sequencing of the activities, and input and output data of the activities;
generate a business operation model from the process model, wherein the business operation model comprises a set of connected dominant information entities;
optionally save the business operation model;
optionally display the business operation model to a user; and
generate executable component definitions based on the business operation model;
wherein generating the business operation model is carried out by (1) generating a domination graph for each dominant information entity comprising nodes and unidirectional edges such that there are no cycles for each information entity, wherein each node in the domination graph represents an information entity and each unidirectional edge represents a domination relationship between a dominant information entity and a dominated information entity; (2) generating a behavior model for each dominant information entity, wherein the behavior model comprises the activities of the process model having the dominant information entity as an input or an output; and (3) generating the business operation model containing behavior models of the set of connected dominant information entities which exchange messages between one another; and
wherein a first information entity is a dominant information entity over a second dominated information entity when (1) for each activity having the second information entity as an input, the first information entity is also an input, (2) for each activity having the second information entity as an output, the first information entity is also an output, and (3) the first information entity is used in at least one activity where the second information entity is not used.

14. The data processing system of claim 13, wherein the processor executing the computer useable program code to generate the behavior model for each dominant information entity further comprises:
the processor further executing computer useable program code to generate a state machine for each dominant information entity comprising a finite number of states, transitions between the finite number of states, and actions performed during the transitions.

15. The data processing system of claim 13, wherein the dominant information entity dominates the dominated information entity through one of referential domination or inclusive domination.

16. The data processing system of claim 13, wherein the domination graph describes data dependencies between the dominant information entity and the dominated information entities as the dominant information entity contains the dominated information entities.

17. The data processing system claim 13, wherein the processor unit further executes the computer usable program code to execute the executable components definitions.

18. The computer implemented method of claim 1, wherein the dominant information entity is not dominated by any other information entity in the business operation model.

19. The computer program product of claim 7, wherein the dominant information entity is not dominated by any other information entity in the business operation model.

20. The data processing system of claim 13, wherein the dominant information entity is not dominated by any other information entity in the business operation model.

* * * * *